United States Patent [19]

Pease

[11] 4,339,751

[45] * Jul. 13, 1982

[54] MARINE RADAR INCLUDING ANTICOLLISION UNIT

[75] Inventor: William M. Pease, Weston, Mass.

[73] Assignee: Raytheon Company, Lexington, Mass.

[ * ] Notice: The portion of the term of this patent subsequent to May 27, 1997, has been disclaimed.

[21] Appl. No.: 70,235

[22] Filed: Aug. 27, 1980

Related U.S. Application Data

[62] Division of Ser. No. 899,952, Apr. 25, 1978, Pat. No. 4,205,313.

[51] Int. Cl.³ .............................................. G01S 7/44
[52] U.S. Cl. ................................................. 343/5 DP
[58] Field of Search ............... 343/5 DP, 5 EM, 5 SC

[56] References Cited

U.S. PATENT DOCUMENTS 4,104,629  8/1978  Isbister et al. ...................... 343/6 R Primary Examiner—T. H. Tubbesing
Attorney, Agent, or Firm—William R. Clark; Milton D. Bartlett; Joseph D. Pannone

[57] ABSTRACT

A bright display radar system having anticollision capabilities in which received signals are digitized at a rate determined by a radar range setting and displayed at a constant relatively slow rate independent of the range setting. A computer based anticollision unit operates in response to the relatively slow digitized received signals so that targets may be tracked equally well at short and long ranges. Two sets of operator actuable switches are provided for controlling the anticollision unit. A first set of switches is provided which correspond directly to the most commonly used computer operating functions. The second includes an alphanumeric keyboard which may be used to actuate subroutines stored in a physically separate read-only memory which operates only in response to the alphanumeric keyboard.

5 Claims, 4 Drawing Figures

MARINE RADAR INCLUDING ANTICOLLISION UNIT

CROSS-REFERENCE TO RELATED CASES

This is a division of application Ser. No. 899,952, filed Apr. 25, 1978, now U.S. Pat. No. 4,205,313.

BACKGROUND OF THE INVENTION

1. Field of the Invention

The invention pertains to radar systems such as are used in marine navigation. More particularly, the invention relates to such radar systems employing collision avoidance capability.

2. Description of the Prior Art

Radar systems having collision avoidance capabilities, in limited use for several years, have recently become of greater importance due to government safety regulations in all major maritime nations. The systems of the known prior art were able to acquire and track targets and to indicate potential areas of collision. Unfortunately, these systems, although able to perform at longer ranges, were unable to track targets at close-in ranges, for example, under approximately three miles. One of the primary reasons why tracking was impossible was that these systems operated using the real-time video signal produced at the output of the radar receiver. At such short ranges, the times between the target signals appearing at the output of the receiver were typically too short for digital processors such as the anticollision apparatus to process. Moreover, because of the use of the real-time video signal, the display produced upon the radar cathode-ray tube was very dim at the short ranges.

Furthermore, in the known systems of the prior art, the equipment associated with the anticollision apparatus tended to be extremely complex to operate, require large amounts of electronic equipment including a separate display for the anticollision unit and requiring large amounts of space on the bridge of a ship.

It is desirable that the anticollision avoidance unit associated with a radar system provide many more functions other than simply tracking targets and warning of any impending collisions. For example, it may be desirable that map lines representing ship channels be drawn upon the cathode-ray tube screen for use in navigation. Or, it may be desired to draw lines on the screen of the cathode-ray tube designating areas in which target returns are to be ignored by the tracking circuitry. In the known systems of the prior art, it was not possible to readily modify the anticollision apparatus to be able to perform such additional functions.

SUMMARY OF THE INVENTION

Figure 1:
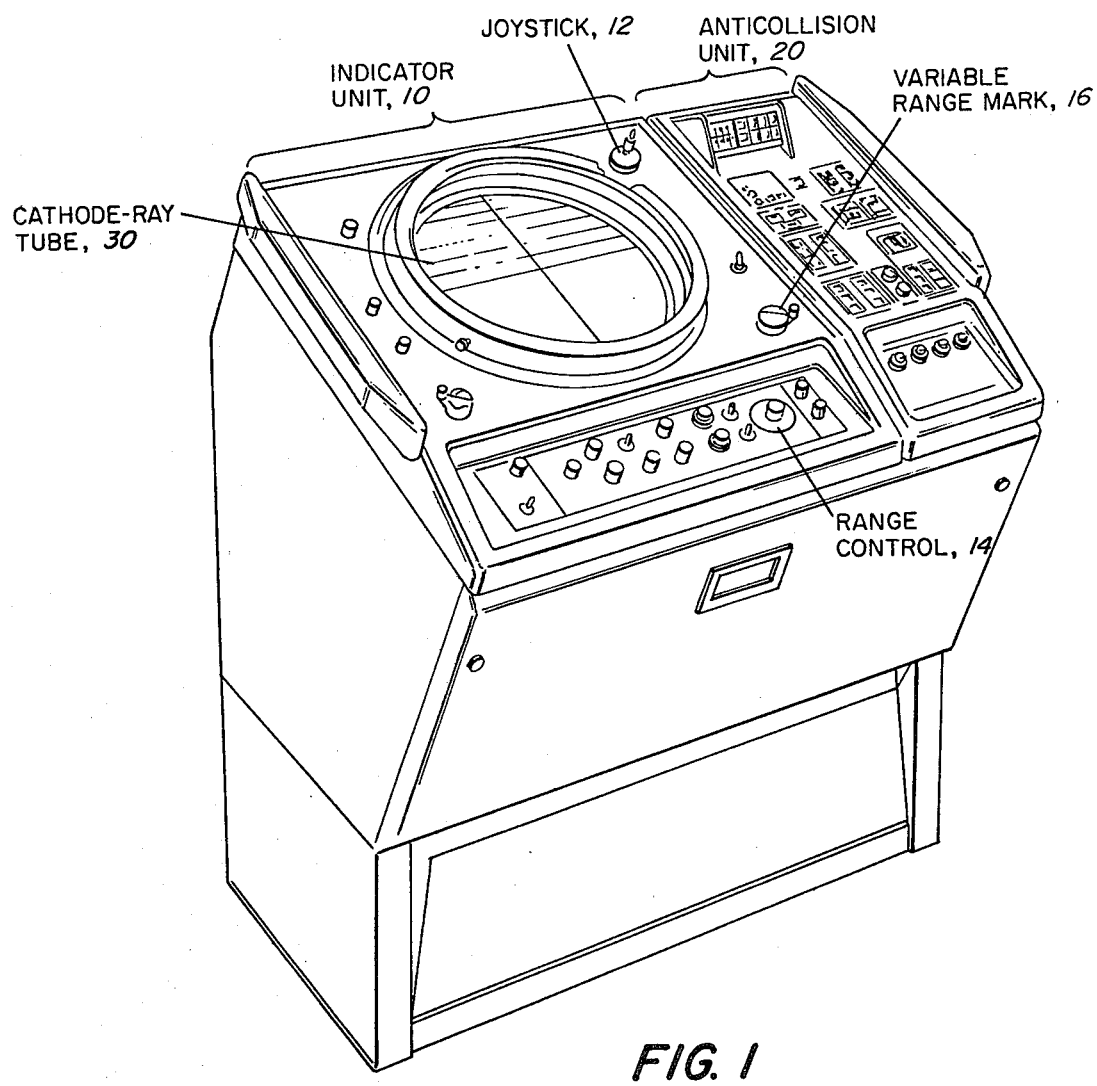
FIG. 1 is a perspective view of a radar system of the invention.

Accordingly, it is an object of the present invention to provide a radar system capable of tracking targets at shorter ranges as well as at longer ranges.

Furthermore, it is an object of the present invention to provide a radar system having anticollision capabilities which can be readily modified to perform additional functions without modifying the system controls or large amounts of the system circuitry.

These, as well as other objects of the invention, may be met by providing the combination of means for forming or producing digital samples of a radar return signal with the samples taken at intervals of time determined by a radar range setting, means for storing these samples, means for reading the samples out of the storing means in sequence at a rate which is constant over a plurality of the radar range settings, and digital computing means coupled to the output of the storing means which receives and is capable of operating upon the samples read out of the storing means at the substantially constant rate. A visual display is produced in response to the samples read out from the storing means. This is done by converting the samples to an analog signal which forms the video signal for operating a cathode-ray tube display. The computing means operates upon at least portions of the samples as they are read out of the storing means to produce data such as lines and synthetically produced symbols for display upon the display means.

The invention may further be practiced by a radar system including the combination of means for forming samples of a radar return signal with the samples being taken at intervals of time determined by a radar range setting, means for storing the samples of the received radar return signals, means for reading the samples out of the storing means sequentially at a rate which is constant over a plurality of the radar range settings, means for storing a predetermined number of the samples read out from the storing means, a digital computer having a data bus, and means for coupling the samples stored in the means for storing the group of samples to the data bus of the computer. In a preferred embodiment there is further provided means for producing a visual display in response to the read-out samples which may be converted to analog form for operating a cathode-ray tube display. Counting means is also preferably provided with the count produced by the counting means changing in response to the samples being read out of the storing means, means for operating upon one or more groups of the samples stored in the means for storing a predetermined number of the samples to produce data for display upon the displaying means, means for comparing the count produced by the counting means with a stored number such as may be supplied by an external digital computer, and means for transferring the samples stored in the means for storing a predetermined number of the samples to the means for operating upon the groups of the samples, the transfer being effected in response to an output from the comparing means.

These and other objects of the invention may also be met by a radar system adapted for automatic tracking of selected targets over a wide range of radar range settings comprising the combination of means for storing samples of a received radar return signal with the samples being taken at intervals of time determined by a radar range setting, means for reading the samples out of the storing means at a constant rate over a plurality of range settings, a digital counter operated such that the count produced changes by one count unit for each sample read out from the storing means, a digital computer, a storage register for storing a digital number produced by the computer which corresponds to and determines the position of a group of the samples relative to the start of the reading out of the samples from the storing means for a designated or predetermined radar pulse with the group comprising a predetermined number of sequential samples, means for comparing the count produced by the digital counter with the number stored in the storage register, a shift register coupled to receive in sequence the samples as they are read out from the storing means with the shift register having the capacity for storing the designated number of samples in the group, and means for coupling the group of the samples stored in the shift register to the digital computer in response to the comparing means.

The invention may otherwise be practiced by providing the combination of means for displaying information derived from radar return signals in the PPI mode of radar display, a digital computer coupled to the display means with the computer operating upon at least portions of the radar return signals for producing signals representing data to be displayed upon the display means, a first set of switches each of which corresponds to a predetermined dedicated function of a first set of functions to be performed by the computer for producing data for display upon the displaying means, and a second set of switches which when operated in predetermined sequences correspond to functions of the second set of functions to be performed by the computer for producing data for display. Each switch of the first set of switches is identified by a label which contains a word, abbreviation, or other indicia which corresponds to the function to be performed upon activation of the switch. The switches of the second set of switches are identified only by numbers or characters not syntactically related to the functions to be performed by the digital computer, that is, there are no labels which bare a meaningful relationship to a corresponding function for any one of the switches. This does not include control switches such as an ENTER switch, or CLEAR ENTRY switch used in conjunction with the operation of the switches of the second set of switches.

Still further, objects of the invention may be met by a radar system which comprises the combination of means for producing a display in response to received radar return signals, a digital computer for producing data for display by the display producing means with the data being produced in response to at least portions of the received radar return signals, a first permanently programmed memory, a first set of operator actuable switches coupled to the computer with each of the switches of the first set corresponding to a predetermined set of instructions stored in the first permanently programmed memory with each of the switches being visually identified such as with a label with a function to be performed upon actuation of the switch, a second permanently programmed memory, and a second set of operator actuable switches coupled to the computer, actuation of the switches of the second set of switches in predetermined sequences corresponding to and activating the processing of predetermined sets of instructions stored in the second permanently programmed memory. The switches of the second set of switches individually have no syntactical correspondence to the instructions stored in either the first or second permanently programmed memories. A read-write memory which may be of the random access type and may further be coupled to the computer such that operations for both sets of instructions stored in the first and second permanently programmed memories are executed using the read-write memory. Numeric displays may also be provided which are operated in response to outputs from the computer.

A radar system in accordance with the invention may further be provided by the combination of means for storing digital samples of radar return signals produced in the PPI mode with the samples taken at intervals of time determined in accordance with a radar range setting, means for reading the samples out of the storing means at a constant rate over at least a plurality of the radar range settings, a digital computer having an address bus and a data bus, a shift register circuit which is coupled to receive the samples in sequence as they are read out from the storing means, a digital counter operated such that the digital count produced changes for each sample read out from the storing means, a storage register for storing a digital number coupled from the computer to the storage register upon the data bus, a comparing circuit which produces an output signal when the count output produced by the digital counter and the digital number stored in the storage register are equal, means for retaining the samples present in the shift register upon the presence of the output signal from the comparing circuit, means for transferring the samples retained from the shift register to the computer upon the data bus, a first permanently programmed read-only memory, a first set of operator actuable switches each of which corresponds to a predetermined set of instructions for performing computer operations with at least some of the operations being performed upon the samples transferred from the shift register upon the data bus, a second permanently programmed read-only memory, a second set of operator actuable switches coupled to the computer and operated in such a manner that actuation of ones of those switches of the second set of switches in predetermined sequences corresponds to predetermined sets of instructions for performing operations with at least some of the samples transferred from the shift register, and means for producing a visual display in response to the samples read out from the storing means and a portion of the data produced by the computer on the data bus. In the preferred embodiment, the display means includes a cathode-ray tube display. Means for receiving the return radar signals may also be provided in the combination.

DESCRIPTION OF THE PREFERRED EMBODIMENT

FIG. 1 shows in perspective view a radar system of the invention including indicator unit 10 and anticollision unit 20. Indicator unit 10 includes a single cathode-ray tube 30 for displaying radar data in the PPI mode. Data produced by anticollision unit 20 is also displayed upon cathode-ray tube 30 simultaneous with the display of the radar return information.

Indicator unit 10 includes a number of display controls for affecting the presentation of radar information and synthetically produced lines and symbols. Joystick control 12 is used for positioning of a cursor symbol such as may be used in a target acquisition procedure in conjunction with anticollision unit 20. Joystick control 12 may also be used for offsetting the ship's own position from the center of the screen of cathode-ray tube 30. The setting of range control 14 determines the maximum range for which radar returns are displayed. Variable range mark control 16 controls the position of a circular range mark centered about the ship's position.

This control may be used in co-operation with anticollision unit 20 to set the boundary of a guard zone around the ship. Any moving target crossing this boundary, in an automatic mode of operation, is automatically tracked by anticollision unit 20.

Because of the reduction in the amount of electronic circuitry required in accordance with the present invention, anticollision unit 20 may be mounted alongside indicator unit 10 to form a single compact integral unit. No separate electronics cabinet is required for anticollision unit 20 nor is there required a separate display unit for performing the anticollision functions.

Figure 2:
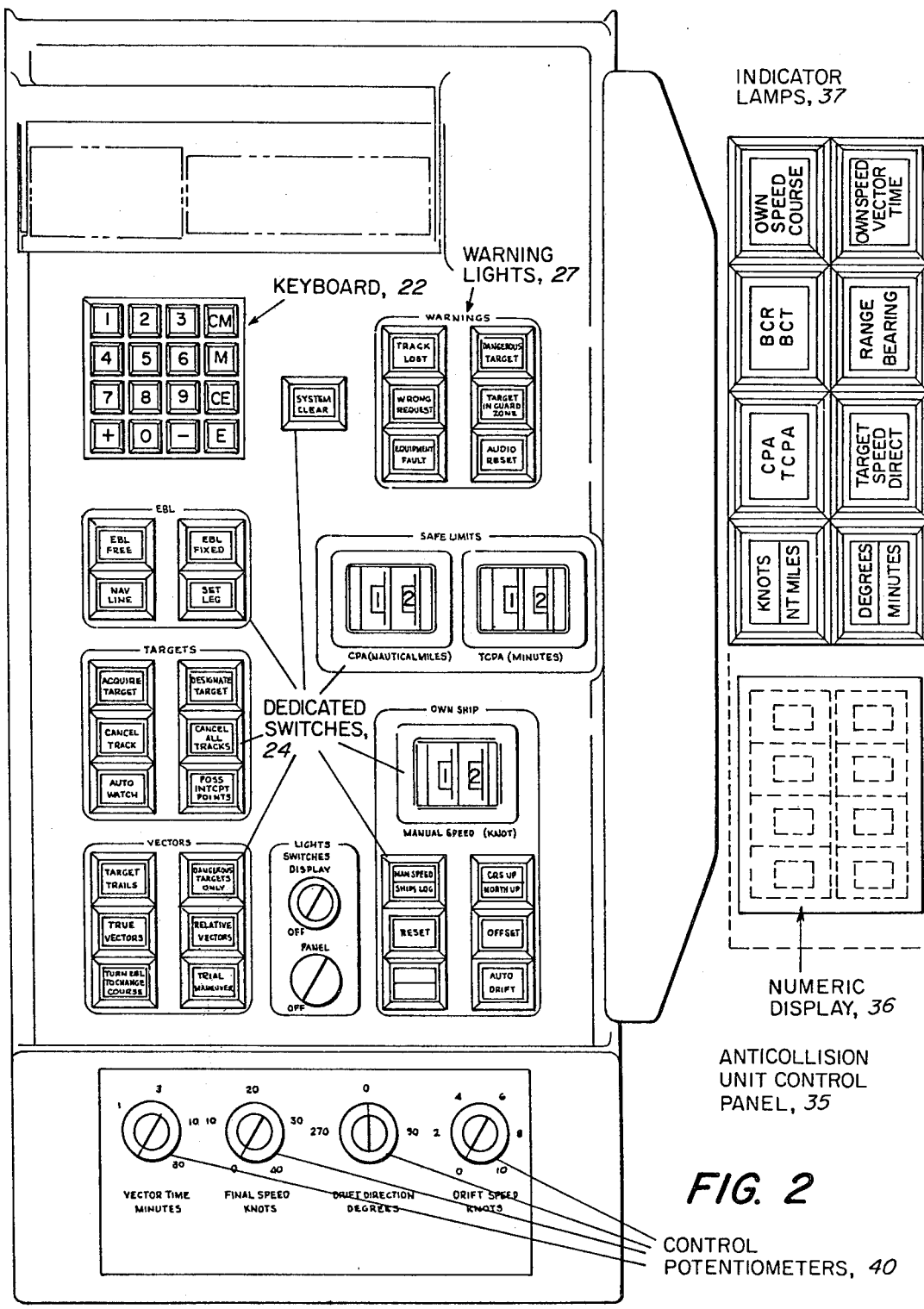
FIG. 2 is a top view of the anticollision control unit of the radar system of FIG. 1.

Referring next to FIG. 2 is the control panel 35 of anticollision unit 20 is shown from a top view. The controls and indicators of control panel 35 are divided into four main groups. At the top of control panel 35 are located numeric displays 36 and indicator lamps 37. In the center portion are located dedicated switches 24 and alphanumeric keyboard 22. Finally, at the bottom of control panel 35 are located control potentiometers 40.

The upper row of numeric displays 36 corresponds to the adjacent row of indicator lamps 37. Similarly, the bottom row of numeric displays 36 correspond to the adjacent horizontal row of indicator lamps 37. In systems operation, the numeric value displayed by a row of numeric display 36 is in the units indicated by a lit lamp of the corresponding row. The left most one of indicator lamps 37 is divided into upper and lower portions one of which may be lit separately.

In the center portion of control panel 35 are located alphanumeric keyboard 22 and dedicated switches 24. Each of dedicated switches 24 corresponds to a particular predetermined function to be performed by the anticollision unit circuitry. Operator actuation of one of dedicated switches 24 causes the operation designated by the legend of the particular switch actuated to be executed in accordance with instructions stored in a computer memory as will be described below.

For convenience of operater usage, dedicated switches 24 are divided into labeled groups according to the functions which are performed upon their actuation. As shown in the view of FIG. 2, the switches are divided into groups for the electronic bearing line (EBL), the controls for the aquisition and control of TARGETS, those for the control of the display of lines or VECTORS, and the controls relating to the speed and course of the ship, and the numeric controls relating to the safe limits of the closest point of approach (CPA) and time to closest point of approach (TCPA). The SAFE LIMITS switches and ships own speed switch are adjustable thumbwheel switches which may be set at any value between 00 and 99.

Keyboard 22 is also located within the center portion of control panel 35. Keyboard 22 performs a number of functions. First, it may be used for operator selection and activation of seldom-used functions, that is those for which an individual dedicated switch is not provided. Secondly, keyboard 22 is used in the case that it is desired to add new functions to this system which were not provided upon the original construction. Thirdly, keyboard 22 can, in preferred embodiments be operated to activate each of the functions controlled by the dedicated switches to provide a back-up activation system which may be used in the case of the failure of one or more of dedicated switches 24. In the preferred mode of operation, to designate a function controlled by keyboard 22, the clear entry (CE) button is pressed, two or more of the numerical keys are depressed in sequence, then the enter (E) button pressed.

Also within the center portion of control panel 35 are located warning lights 27. Warning lights 27 are activated in case of, for example, a lost track, a dangerous target, or a target within a preset guard zone. Although preferred functions have been herein described for some of dedicated switches 24, it is to be understood that the exact function preformed by each of the dedicated switches 24 is not the most important point here described. Of primary importance however, is the division of operator control between dedicated switches 24 and alphanumeric keyboard 22.

Below dedicated switches 24 at the lower portion of control panel 35 are located control potentiometers 40. Control potentiometers 40 permit operator setting of a number of predetermined factors for use in the anticollision calculations and operations.

Figure 3:
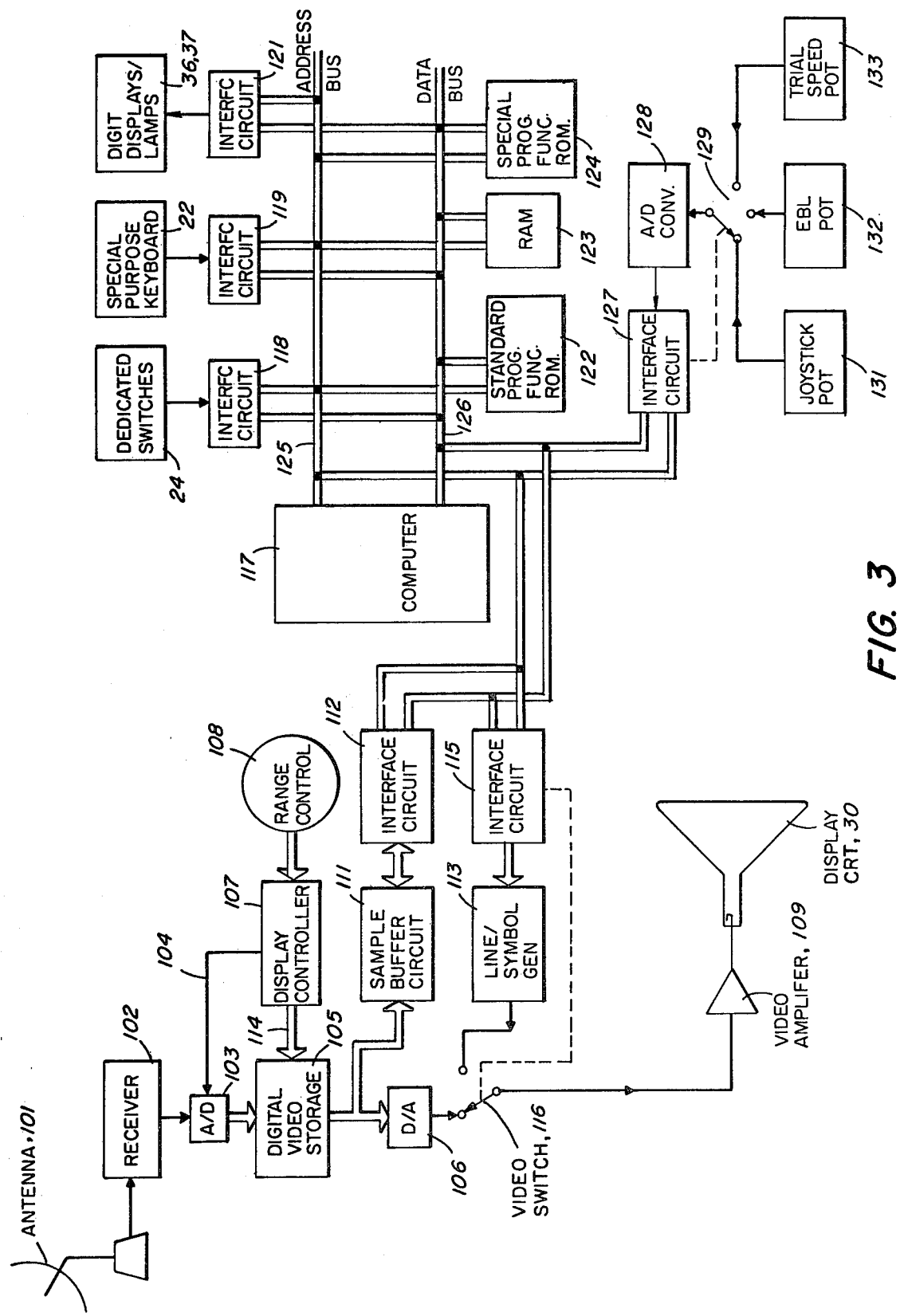
FIG. 3 is a schematic block diagram of a portion of the radar system shown in FIG. 1.

Referring next to the diagram of FIG. 3, the operation of a radar system in accordance with the invention will be described. Radar pulses are produced by a radar transmitter, not shown, and transmitted through antenna 101. After transmission of each pulse, signal echoes from targets are intercepted by antenna 101 and coupled to radar signal receiver 102.

Samples of the demodulated received output signals from receiver 102 are taken by analog-to-digital converter 103. The sampling rate and hence the corresponding distance between samples is controlled by the setting of range control 108 through display controller 107. To accomplish this, display controller 107 produces on line 104 a clock signal having a period in proportion to the range selected by range control 108. Preferably, for each radar return signal, that is the signal received for a single transmitted radar pulse, the number of samples taken of a radar return signal is independent of the range selected at least over most of the possible radar range settings. The samples for each radar return period are clocked into digital video storage unit 105 as they are produced by analog-to-digital converter 103. The clock pulses for performing this operation are also produced by display controller 107 on line 114 at the same rate as those on line 104.

After the last sample for a radar return period is loaded into digital video storage unit 105, the samples are read out at a rate also controlled by display controller 107. However, unlike the read-in operation, the samples are read out at a rate which is independent of the setting of radar range control 108, at least over most of the radar range settings provided.

As the samples are read out from digital video storage unit 105, they are converted to a continuous analog signal by digital-to-analog converter 106. With video switch 116 in the position shown, the analog signal is amplified by video amplifier 109 then coupled to display cathode-ray tube 30 for modulating the beam intensity of cathode-ray tube 30 in a manner well known in the art.

The rate at which the samples are read out from digital video storage unit 105 is preferable substantially the same rate at which they were read in for the longest of the radar range settings. Thus, for the shorter ranges the video signal produced at the output of digital-to-analog converter 106 is effectively expanded in time from the original demodulated signal produced at the output of receiver 102. As the beam of display cathode-ray tube 30 need be swept across the face of cathode-ray tube 30 at a much slower rate to display the signals at the slower rate at which they are produced at the output of digital-to-analog converter 106 than was done in prior art systems in which the receiver output was used directly, a much brighter presentation is effected at shorter ranges. The details of the construction of one version of such a system from receiver 102 to display cathode-ray tube 30 are shown in allowed U.S. patent application Ser. No. 755,320 filed on Dec. 29, 1976 and assigned to the present assignee. Details of a system in accordance with the teachings of the present invention are also shown herein in FIG. 4 and its accompanying text.

A computer 117 is provided to perform the anticollision and other specialized target and display processing functions in accordance with the invention. Computer 117 may be any of a number of comercially available computing units such as the Raytheon RP-16 mini computer. Computer 117 has an address bus 125 and a data bus 126 as is well known for such computer systems.

In order to perform calculations and data manipulations related to anticollision functions, data representing at least portions of the radar return signal in some form must be transferred to data bus 126 of computer 117. Prior art systems utilized the analog signal directly at the output of the radar receiver, digitizing it and performing the computer calculations for the anticollision functions in "real time", that is, the rate at which the signals were produced at the output of the receiver. In contradistinction, with the present invention, the data transferred from the receiving and video processing circuitry is taken at the output of digital video storage unit 105, which is explained above, produces as its output samples of the video signal at a rate which is independent of the radar range setting and at a much slower rate at the shorter ranges than in prior systems. Because of this property, the computation and digital processing circuitry of the anticollision unit of a radar system in accordance with the present invention may operate and process target data at a rate which is also independent of the radar range setting and at a slower rate for short ranges. This is of particular importance at the shorter radar range settings where more time is made available for target signal data processing than was possible with the prior art systems. Thus, a system embodying invention can process and track targets at close-in ranges, such as within three miles, equally well as for targets positioned at further distances from the ship's position.

To accomplish the transfer, data from the output of digital video storage unit 105 is coupled into sample buffer circuit 111 under timing control from display controller 107. In typical systems in operation, digital video storage unit 105 stores 512 samples of 2-bits each of the video signal while sample buffer circuit 111 stores only a selected portion of the 512 samples.

Sample buffer circuit 111 is coupled to computer 117 through interface circuit 112. Inferface circuit 112 is of standard design for such circuits including address identification circuitry, data buffers, and line drivers.

Also during normal systems operation, computer 117 produces data on data bus 126 that is indicative of lines or symbols which are to be displayed upon the screen of cathode-ray tube 30. This data is communicated through interface circuit 115 to line/symbol generator 113. During the times that lines or symbols are being written, video switch 116 couples the input of video amplifier 109 to the output of line/symbol generator 113. Video switch 116, which is preferably an electronic switch, is also operated by interface circuit 115 under command of computer 117. Line/symbol generator 113 may be of standard design.

Dedicated switches 24, keyboard 22, numeric display 36 and indicator lamps 37 are coupled respectively through interface circuits 118, 119, and 121 to address bus 125 and data bus 126 of computer 117. Each switch of dedicated switches 24 is represented by a bit position in a data word coupled to data bus 126. The various dedicated switches are grouped in groups of switches with the number of switches in the group equal or less in number to the number of bits of data bus 126. For example, if data bus 126 is of sixteen-bit design, sixteen switches of dedicated switches 24 from each of the groups may correspond to one data word although there may be unused bit members and a lesser number of switches used in the group. Each of these groups is addressed through interface circuit 118 by a particular address upon address bus 125. Each time the address corresponding to a group of switches of dedicated switches 24 is present upon address bus 125, the corresponding data word is assembled through interface circuit 118 and coupled to data bus 126. If one of the switches within the addressed group has been actuated by an operator, the corresponding data bit is set to, for example, the logical "1" state. Each data word produced through interface circuit 118 corresponds to a particular set of instructions for performing computer operations stored in standard program functions read-only memory 122. Standard program functions read-only memory 122 is coupled to address bus 125 and data bus 126 in the usual manner. Random access momory 123, which may be a volatile semiconductor memory, is also coupled to address bus 125 and data bus 126. Random access memory 123 provides the temporary storage necessary for performing the anticollision calculations and other data manipulations or operations.

Keyboard 22 is coupled through interface circuit 119 to address bus 125 and data bus 126 in a manner similar to that of dedicated switches 24. A data word is assembled at interface circuit 119 with each switch corresponding to a bit within the word. In the preferred system configuration with a sixteen-bit wide data bus, only one data word and hence address upon address bus 125 need be provided for the entire set of switches of keyboard 22.

The computer programs or instructions corresponding to keyboard 22 are stored within special program functions read-only memory 124. In physical construction, special program functions read-only memory 124 is preferably constructed using one or more separate printed circuit cards containing semiconductor read-only memories. Printed card circuits connectors are provided so that each of these printed circuit cards may be plugged into a socket coupling it to address bus 125 and data bus 126.

Numeric displays 36 and indicator lamps 37 are activated by computer 117 also through address bus 125 and data bus 126. To light one of indicator lamps 37, an address is produced on address bus 125 corresponding to the group of lamps to which the desired lamp belongs. A word is simultaneously produced upon data bus 126 with one or more bits set to determine which lamps of the particular group of lamps is to be lit. In the case of numeric displays 36, each display is addressed by a separate address upon address bus 125. When a particular numeric display 36 is addressed, a word simultaneously appearing upon data bus 126 indicates the numeral to be displayed. It is of course well-known in the art how to produce a numeric display in response to an input binary or other code indicative or the desired numeral.

The various system control potentiometers are also coupled to data bus 126. Three are shown here in the view of FIG. 3, that for joystick potentiometer 131, electronic bearing line potentiometer 132, and trial speed potentiometer 133. Only three are shown for purposes of illustration. Other system potentiometers are coupled to data bus 126 in the same manner. At predetermined periods computer 117 samples a voltage output produced by each potentiometer in sequence by producing an address upon address bus 125 corresponding to the particular potentiometer addressed. This causes interface circuit 127 to position electronic switch 129 to couple the designated potentiometer to analog-to-digital converter 128. The digitized output from analog-to-digital converter 128 is coupled back through interface circuit 127 to data bus 126. Computer 117 may then perform whatever function or operation is required with the acquired digital indication of the potentiometer setting.

Figure 4:
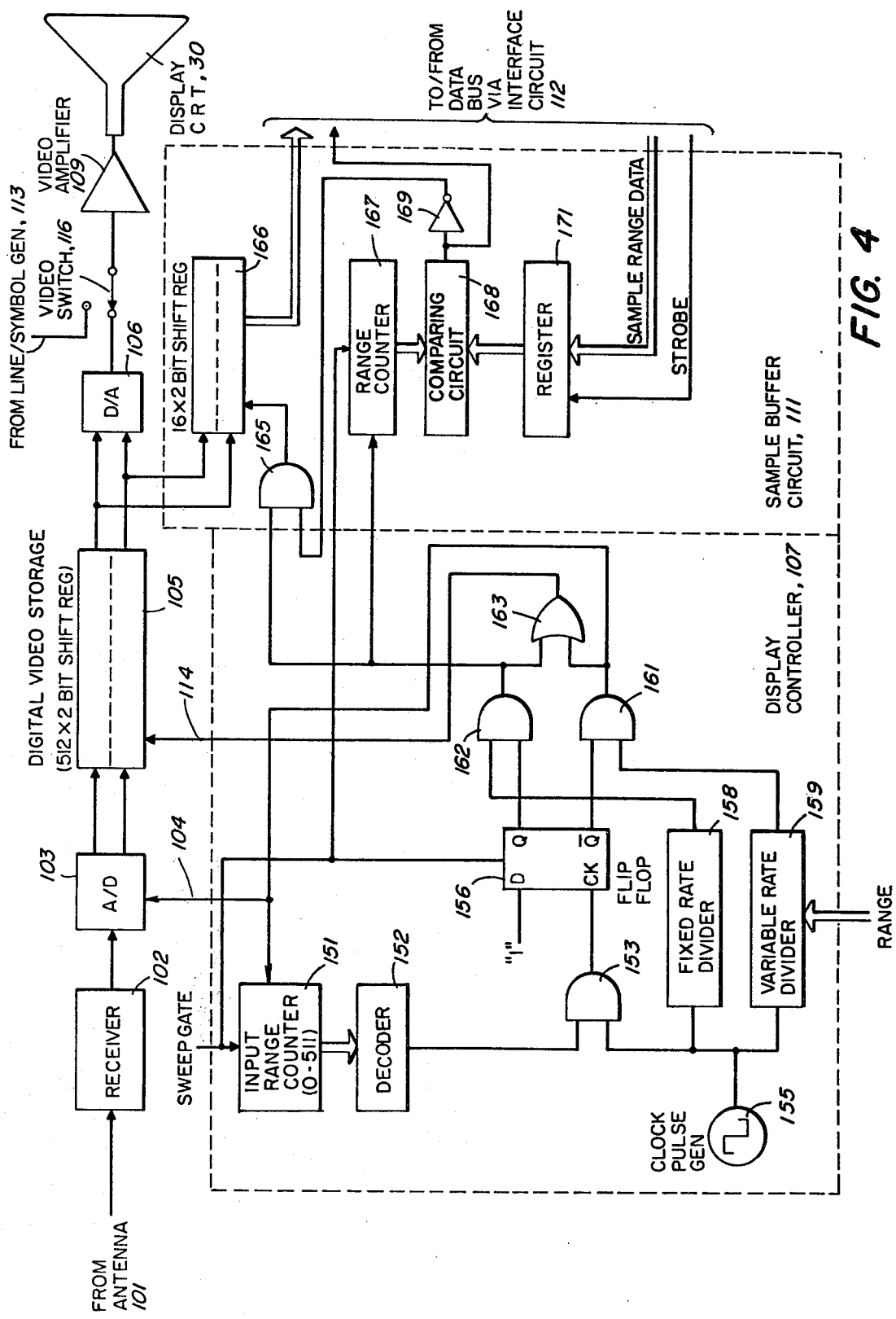
FIG. 4 is a schematic diagram of a portion of the system shown in FIG. 3.

Referring next to the diagram of FIG. 4, the operation of display controller 107, sample buffer circuit 111 and the video signal processing circuit chain will be discussed in more detail. As explained above in conjunction with the explanation of FIG. 3, the signals from antenna 101 are coupled to receiver 102 which produces as its output a demodulated received signal. The demodulated signal is coupled to the signal input of analog-to-digital converter 103. One sample of the received signal is taken for each pulse input to analog-to-digital converter 103 on pulse input line 104. In the preferred embodiment, a two-bit sample of the analog signal is taken for each pulse.

The samples of the received signal are stored in the order in which they are received at the input of digital video storage unit 105. In the preferred embodiment, digital video storage unit 105 is constructed of two 512-bit shift registers operated in parallel with one another, that is, with the same clock signal.

The pulses for operating digital video storage unit 105 for both the loading and unloading operations are produced on line 114. At the beginning of each radar pulse period, the time at which the radar pulse is transmitted, a pulse on the SWEEP GATE line resets range counter 151 to the all "0" state and resets D-type flip-flop 156 so that the Q output is in the "0" state and the Q̄ output in the "1" state. This enables AND Gate 161 to pass pulses on its lower input through OR gate 163 to line 114. These pulses are produced by dividing down in frequency the clock pulse stream produced by clock pulse generator 155. This is accomplished by variable rate divider 159 which divides the frequency of pulses produced by clock pulse generator 155 by a factor determined in accordance with a digital input produced by range control 108. The period of the clock signals produced at the output of 159 is preferably in proportion to the range of the range scale selected.

While digital video storage unit 105 is being loaded, the pulses on the output of AND gate 161, which are also coupled through gate 163 to line 114, are coupled to analog-to-digital converter 103 and to the clock input of range counter 151. Input range counter 151 is thereby incremented by a single count for each sample stored in digital video storage unit 105. When a count of 511 has been reached indicating that digital video storage unit 105 is full for the particular radar pulse period, decoder 152 detects the presence of the count of 151 and produces as a result of a logical "1" on its output. This enables AND gate 153 permitting a clock pulse from clock pulse generator 155 to pass through causing flip-flop 156 to change state. AND gate 161 is then disabled and gate 162 enabled permitting the pulses from fixed rate divider 158 to pass through to the input of OR gate 163 as well as to sample buffer circuit 111. Fixed rate divider 158 divides down the clock output of clock pulse generator 155 to the rate desired for reading the samples out of digital video storage unit 105. These samples are read out from the serial outputs of the two 512-bit shift registers to digital-to-analog converter 106 producing an analog signal which is coupled to video amplifier 109 and hence to cathode-ray tube 30.

Sample buffer circuit 111 takes a sixteen-sample group at a range designated by computer 117 from the output of digital video storage unit 105 and transfers it back to computer 117 on data bus 126. Sixteen-by-two bit shift register 166 continuously receives the sample outputs from digital video storage unit 105 during the read out operation. These samples are received serially at the output rate from digital video storage unit 105. Samples beyond the sixteenth last previous sample are discarded. Sixteen-by-two bit shift register 166 operates from the clock pulses produced by fixed rate divider 158 coupled through gates 162 and 165.

At some time during a computer cycle, not necessarily synchronous with the operation of display controller 107, a number is transferred from computer 117 via data bus 126 to register 171 representing the number in the 512-bit sequence of the last-in sample of the 16-bit group of samples desired to be transferred to computer 117. Range counter 167, reset to zero by the SWEEP GATE signal, advances by one count for each sample loaded into shift register 166. Comparing circuit 168 examines the outputs of both range counter 167 and register 171 and produces a logical "1" output when they are equal.

The output of comparing circuit 168 is used as a flag for interface circuit 112 to signal computer 117 that a sixteen-sample group is ready for transfer. The logical "1" produced on the output of comparing circuit 168 is inverted by inverter 169 to inhibit gate 165 from passing any further clock pulses thus locking the desired value into shift registers 166.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. In combination:

means for providing digital samples of radar echo signals, said digital samples being taken at intervals of time determined by a radar range setting;

means for storing said digital samples of said radar echo signals;

means for sequentially reading said samples out of said storing means at a rate constant over a plurality of radar range settings;

means for displaying in the PPI mode information derived from said samples;

a digital computer coupled to said displaying means, said digital computer operating upon at least portions of said samples for producing signals representing data to be displayed;

a first set of switches, each of said switches of said first set corresponding to a predetermined set of instructions for performing computer operations, at least some of said operations being performed by said computer for producing display data derived from said samples; and a second set of numerically identified switches, activation of said switches of said second set of switches in a predetermined sequence corresponding to a predetermined set of instructions for performing a computer operation, said operation performed by said computer for producing display data derived from said samples.

2. The combination of claim 1 wherein:

each switch of said first set of switches is identified in correspondence with the function to be performed by activation of the switch; and said switches of said second set of switches are each identified by one or more alphanumeric characters not syntactically related to the functions performed by said digital computer.

3. A radar system comprising in combination:

means for providing digital samples of radar echo signals, said digital samples being taken at intervals of time determined by a radar range setting;

means for storing said digital samples of said radar echo signals;

means for sequentially reading said samples out of said storing means at a rate constant over a plurality of radar range settings;

means for producing a display in response to said samples read out of said storing means;

a digital computer, said digital computer producing data for display by said display producing means, said data being produced in response to at least some of said samples read out of said storing means;

a first permanently programmed memory;

a first set of operator actuable switches coupled to said computer, each of said switches corresponding to a predetermined set of instructions stored in said first permanently programmed memory, each of said switches being visually identified with a function derived from said radar echo signals to be performed upon actuation of the switch;

a second permanently programmed memory; and a second set of operator actuable switches coupled to said computer, actuation of said switches in predetermined sequences corresponding to predetermined sets of instructions stored in said second permanently programmed memory, said switches individually having no syntactical correspondence to said instructions.

4. The combination of claim 3 further comprising:

a read-write memory coupled to said computer, operations for both said sets of instructions stored in said first permanently programmed memory and said sets of instructions stored in said second permanently programmed memory being executed with the use of said read-write programmed memory.

5. The combination of claim 3 further comprising:

a plurality of numeric displays coupled to said computer.

* * * * *